(12) United States Patent
Viraldo (10) Patent No.: US 6,962,106 B2
(45) Date of Patent: Nov. 8, 2005

(54) OUTDOOR COOKING SYSTEM

(76) Inventor: John E. Viraldo, 217 W. Lancaster, N. Muskegon, MI (US) 49445

( * ) Notice: Subject to any disclaimer, the term of this patent is extended or adjusted under 35 U.S.C. 154(b) by 314 days.

(21) Appl. No.: 10/331,414

(22) Filed: Dec. 30, 2002

(65) Prior Publication Data

US 2004/0123857 A1   Jul. 1, 2004

(51) Int. Cl.[7] .............................................. A47J 37/00
(52) U.S. Cl. ........................... 99/339; 99/340; 99/448; 99/449
(58) Field of Search ........................ 99/339, 340, 449, 99/448; 126/275 R, 274, 9 R, 25 R, 4

(56) References Cited

U.S. PATENT DOCUMENTS

| | | | |
|---|---|---|---|
| 27,115 A * | 2/1860 | Dunklee .................. | 126/275 R |
| 2,097,793 A | 11/1937 | Howell | |
| 2,517,254 A * | 8/1950 | Steele .......................... | 126/93 |
| 2,766,682 A * | 10/1956 | Smith .......................... | 99/419 |
| 3,040,651 A | 6/1962 | Krieger | |
| 3,359,963 A | 12/1967 | Kostial | |
| 3,765,397 A * | 10/1973 | Henderson ................. | 126/25 R |
| 4,094,295 A | 6/1978 | Boswell et al. | |
| 4,300,444 A | 11/1981 | Muse | |
| 4,495,860 A | 1/1985 | Hitch et al. | |
| 4,587,947 A | 5/1986 | Tomita | |
| 4,722,322 A | 2/1988 | Varney et al. | |
| 4,773,319 A | 9/1988 | Holland | |
| 4,909,137 A | 3/1990 | Brugnoli | |
| 4,957,039 A * | 9/1990 | Reyes .......................... | 99/340 |
| 4,962,697 A | 10/1990 | Farrar | |
| 4,971,027 A | 11/1990 | Krieger | |
| 5,044,266 A | 9/1991 | Geogaris | |
| 5,097,753 A | 3/1992 | Naft | |
| 5,313,877 A | 5/1994 | Holland | |
| 5,359,923 A * | 11/1994 | Boswell ....................... | 99/340 |
| 5,473,979 A * | 12/1995 | Ruben .......................... | 99/446 |
| 5,642,660 A * | 7/1997 | Killgore et al. ............... | 99/403 |
| 5,649,477 A | 7/1997 | Lingwood | |
| 5,842,409 A * | 12/1998 | Loffler et al. ............. | 99/421 V |
| 5,862,741 A | 1/1999 | Wodeslavsky | |
| 5,909,729 A | 6/1999 | Nowicke, Jr. | |
| 6,016,797 A | 1/2000 | Nowicke, Jr. | |
| 6,189,528 B1 | 2/2001 | Oliver | |
| 6,213,006 B1 | 4/2001 | Reardon | |
| 6,314,868 B1 | 11/2001 | Christensen et al. | |

* cited by examiner

Primary Examiner—Reginald L. Alexander
(74) Attorney, Agent, or Firm—Price Heneveld Cooper DeWitt & Litton LLP (57) ABSTRACT

An outdoor cooking apparatus includes a base heating unit and at least one cooking chamber adapted to interlockingly engage the heating unit so that the heating unit and cooking chamber can be carried separately or as a unit. The base heating unit includes a housing adapted to support burning charcoal, and at least one air opening above and below the support, respectively, that are closeable to control air flow. Several different cooking chambers are provided that nest against the heating unit and/or nest into each other and/or stack on each other. The heating unit includes a funnel to direct food grease to a collection place, and a seasoning pan that both shields the funnel from heat and that holds seasoning for flavoring food being cooked.

18 Claims, 10 Drawing Sheets

OUTDOOR COOKING SYSTEM

BACKGROUND

The present invention relates to outdoor charcoal cooking apparatus, and more particularly relates to a cooking apparatus having a charcoal heating unit and having multiple rearrangeable chambers nestable on the heating unit for creating different atmosphere-controlled heating conditions, such as for "moisture-captured" cooking, smoking, steaming, grilling, and variations and combinations thereof.

U.S. Pat. No. 4,094,295 discloses a charcoal and water smoker and cooker having a tubular body with a closed dome top. The cooker is designed to better control temperature within the cooker, as compared to open grills, and further is designed with upper and lower grills that provide different cooking positions. However, the cooker in the '295 patent is more limited in its capabilities and function than is desired. For example, there is basically only one cooking chamber. Further, the top is not secured to the bottom heating unit, such that the cooker cannot be easily moved as a unit once the charcoal is burning. Also, although the cooker includes a thermometer, temperature is still difficult to control, especially when foods are being cooked that require different temperatures and/or separation from other foods during the cooking process. For example, the cooker disclosed in the '295 patent cannot simultaneously cook meat, warm bread, and bake a pie.

As noted in the '295 patent, prior art grills have difficulty controlling temperature and require constant attention. Hence, there is a desire for an outdoor cooking device that is better able to accommodate different foods and that is able to cook them under more controlled and uniform heating conditions. There is also a need for an outdoor cooker that is flexible and adaptable to different needs and types of cooking, and able to satisfy different tastes, including the ability to smoke, steam (with or without seasonings), fry, grill, bake, and warm. Preferably, any such outdoor cooker should not complicated, but instead should be easy and intuitive to use, and cost-effective to manufacture so that it is affordable. It is also desirable for the cooker to have optional features, such that "high-end" and "low-end" models can be offered for sale.

An important consideration is that the cooker provide good management of heat flow (convection, conduction, radiation), and good control of the charcoal burn. Also, the cooker should control moisture and flow of flavoring (smoking, seasoning vapors, steam, etc.) during the cooking process. It is desirable to provide a cooker that facilitates keeping food hot without "over-cooking", and that facilitates food delivery (carrying to an eating site and/or intermittent food distribution spread over a block of time). One important consideration is management of grease and fluids that drip from food while being cooked. It is important in cookers to avoid a burned-grease taste, and to avoid grease fires. One way is to direct the grease to a collection location separate from the charcoal fire but in a safe place where it will not catch fire or be spilled. However, this must be done without unacceptably complicating the cooker.

Accordingly, an outdoor cooking apparatus is desired having the aforementioned advantages and that overcome the aforementioned disadvantages.

SUMMARY OF THE PRESENT INVENTION

In one aspect of the present invention, an outdoor cooking apparatus includes a base heating unit and at least one cooking chamber adapted to rest on the heating unit. The base heating unit includes a housing and a support in the housing adapted to support burning charcoal. The housing further has at least one air outlet and at least one air inlet above and below the support, respectively. The cooking chamber has a bottom shaped to removably interlockingly engage the housing for secure positioning on the heating unit when cooking food. By this arrangement, the heating unit and cooking chamber can be carried separately or as a unit.

In another aspect of the present invention, an outdoor cooking apparatus includes a base heating unit having a housing with a top outer shape, and an outer chamber having a bottom outer shape about equal to the top outer shape for nesting against the top outer shape. The apparatus further includes an inner chamber adapted to fit inside of the outer chamber. The inner chamber, when nested within the outer chamber, defines a heating space between the inner and outer chambers that is adapted to capture heat rising from the heating unit. By this arrangement, the heating space captures and circulates heated air rising from the heating unit for cooking within the inner chamber.

In another aspect of the present invention, a cooking apparatus includes a base heating unit, and a plurality of cooking chambers. Each cooking chamber is positionable on the heating unit and is configured to nestingly engage and rest on a top of the heating unit. A first one of the cooking chambers is also configured to engage a second one of the cooking chambers, whereby the cooker can be selectively arranged with the first and second chambers stacked on the heating unit, or with the first chamber alone on the heating unit.

In another aspect of the present invention, a cooking apparatus includes a base heating unit, and a cooking chamber stackable on the heating unit. The cooking chamber has a sidewall, an open first end, and a closed second end. The cooking chamber is adapted to matingly engage and rest on the cooking chamber in a first position with the open first end facing upward, and is adapted to matingly engage and rest on the cooking chamber in a second position with the open first end facing downward.

In another aspect of the present invention, an outdoor cooking apparatus includes a base heating unit, and a cooking chamber stackable on the heating unit. The base heating unit includes a grating resting on a top of the base heating unit and further includes adjustable food holders adjustably supported on the grating. The food holders extend upwardly into the cooking chamber for supporting food above a bottom of the cooking chamber.

In another aspect of the present invention, an outdoor cooking apparatus includes a base heating unit with a housing, a grill adapted to support food being cooked in the housing, and a support below the grill for supporting burning charcoal. The housing has at least one air inlet below the support. A funnel-shaped grease catcher is provided under the grill and is adapted to catch grease dripping from the food on the grill. The grease catcher has a funnel member adapted to direct the grease to a location below the support and below the burning charcoal for collection. A pan is provided that is shaped to receive the funnel member while at least partially protecting the funnel member from direct heat from the burning charcoal so that the grease does not burn and start a fire. The pan includes a bottom and a sidewall defining a recess to hold the seasoning, but the sidewall has an upper lip defining a gap to the funnel member so that flavorful vapors rising from the pan flow up and around funnel member to flavor the food being cooked.

These and other aspects, objects, and features of the present invention will be understood and appreciated by those skilled in the art upon studying the following specification, claims, and appended drawings.

DETAILED DESCRIPTION OF PREFERRED EMBODIMENTS

An outdoor cooking apparatus 20 (FIG. 1) includes a base heating unit 21 (FIG. 2) and a plurality of cooking chambers 22–24 adapted to interlockingly engage the heating unit 21 so that the heating unit 21 and cooking chambers 22–24 can be carried separately or as a unit. The base heating unit 21 includes a housing 25 (FIG. 2) with an internal support 26 adapted to support burning charcoal, and at least one air opening 28 above and at least one air opening 29 below the support, respectively, that includes doors 28A and 29A closeable to control air flow. The different cooking chambers 22–24 are nestable against the heating unit 21 and/or nest into each other and/or stack on each other. By the various arrangements, a number of different heating conditions can be created, permitting a complete connoisseur dinner to be simultaneously cooked, even with a novel chef. An important aspect is that the heating unit 21 includes a funnel 30 shaped to direct food grease through the burning charcoal to a place of collection on a bottom of the heating unit 21. A seasoning pan 32 includes a hole through which the funnel 30 extends, such that the pan 32 both shields the funnel 30 from the direct heat of the charcoal, and also is able to hold seasoning for flavoring the food being cooked.

Figure 15:
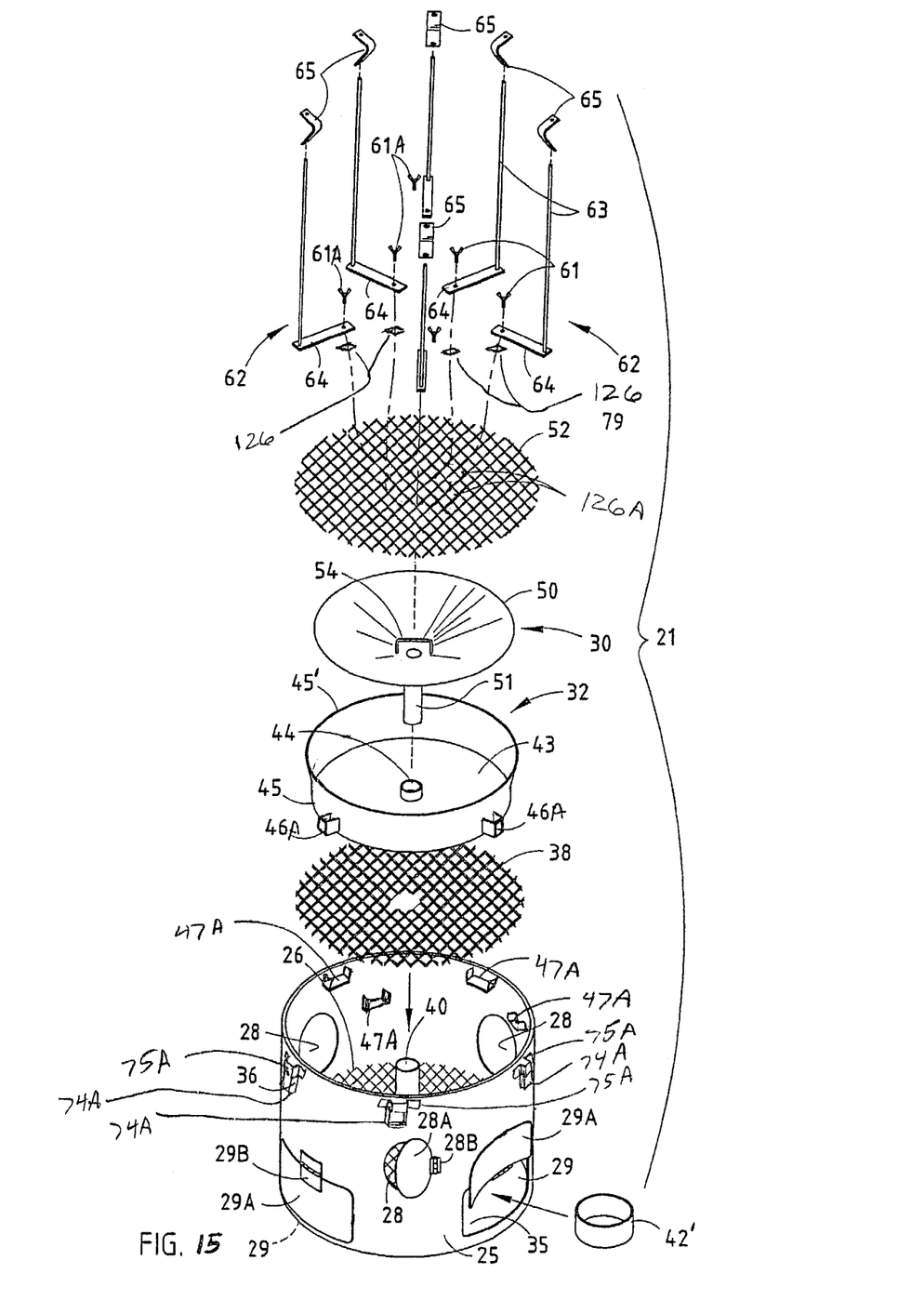

As noted above, the base heating unit 21 (FIG. 2) includes the housing 25 and internal support 26 for supporting charcoal. The housing 25 includes a cylindrical sidewall 36, and preferably include an open bottom 35. The support 26 includes brackets that fixedly support an open mesh grating 37. A second grating 38 can be placed on the first grating 37, and is made rotatable so that ashes can be shaken off the grating 37/38 by rotatingly oscillating or vibrating the grating 38 on the grating 37. A small flange handle can be attached to the grating 38 to assist in shaking the grating 38, if desired. A tube section 40 having a 1½ inch to 2-inch diameter extends up from a center of the grating 37. A bottom of the tube section 40 extends only slightly below the grating 37, such that the area under the grating 37 is generally open. Thus an oven-like chamber is created in the heating unit 21, under the grating 37. At least one of the air openings 29 are large enough to receive a TV tray 42, or grease collector pan 42', or other small tray. Thus, the bottom area of the heating unit 21 can be used much like a small oven. Doors 28A and 29A are shaped to cover the openings 28 and 29, respectively, and include hinges 28B, 29B and latches 28C, 29C for holding the doors closed (FIGS. 1–2) and/or for holding the doors partially open (see the left door 29A in FIG. 1) or fully open (see the right door 29A in FIG. 2). The illustrated latches are simply rotatable tabs operably attached to the sidewalls of the heating unit 21. More sophisticated latches, such as snaps, magnets, hooks, etc., can be used, if desired. Also, the latches 28C and 29C can be eliminated by using stiff hinges that are frictionally tight. (See FIG. 15.) "Stiff hinges" can also be accomplished by using a bent hinge pin, for example, such as occurs when a flat hinge is forced to take on the cylindrical shape of the sidewall 36 of the heating unit 21. Stops 29D prevent the chamber 22 from sliding downwardly over the housing 25.

Seasoning pan 32 (FIG. 2) includes a bottom panel 43 with a center tube 44 shaped to telescopingly receive and fit around the tube section 40, and further includes a sidewall 45 with radial flanges 46 adapted to center the seasoning pan 32 in the heating unit 21. V-shaped brackets 47 on an inside of the housing sidewall engage the flanges 46 to hold the seasoning pan 32 at an elevated height above the grating 37/38. (The brackets 46 and 47 can have other shapes, as shown by the brackets 46A and 47A in FIG. 15.) A top of the illustrated sidewall 45 flares outward slightly but stops short so that there is an air gap between a top lip 45' of the sidewall 45 and the sidewall of the housing 25. It is noted that the flared portion of the top can be eliminated if desired.

Funnel 30 (FIG. 2) includes an angled top grease-catcher section 50 and a tubular bottom section 51. The tubular bottom section 51 is shaped to fit telescopingly through the tube section 44 in the seasoning pan 32 and through the center tube 40 in the heating unit 21.

Figure 2:
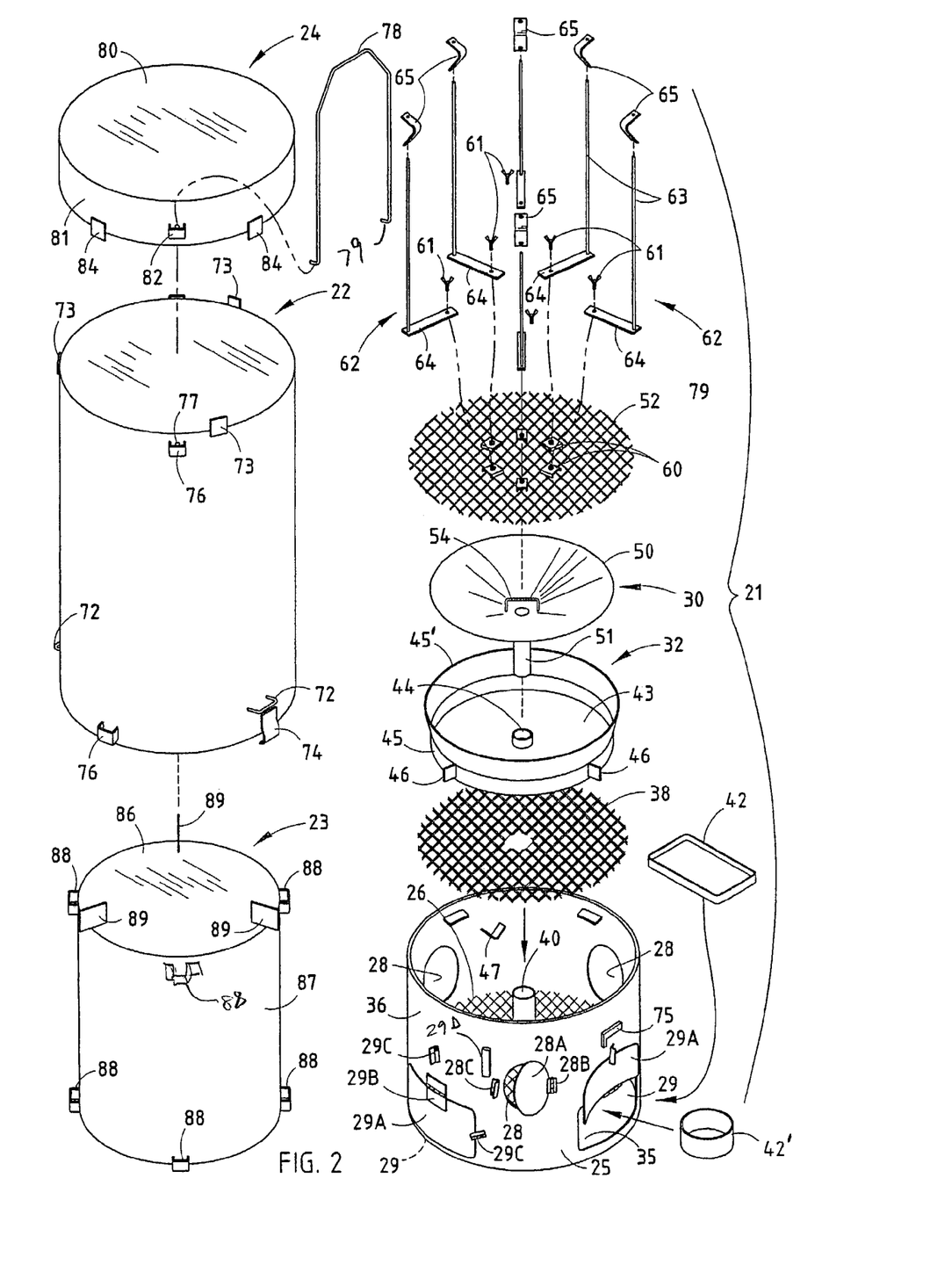
FIG. 2 is an exploded view of FIG. 1.
Figure 3:
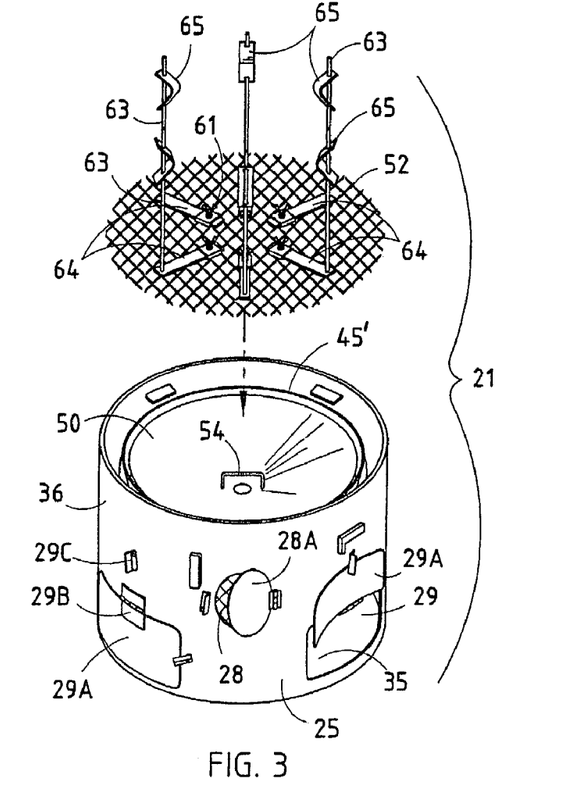
FIG. 3 is a partially exploded perspective view of the base heating unit shown in FIG. 2.
Figure 4:
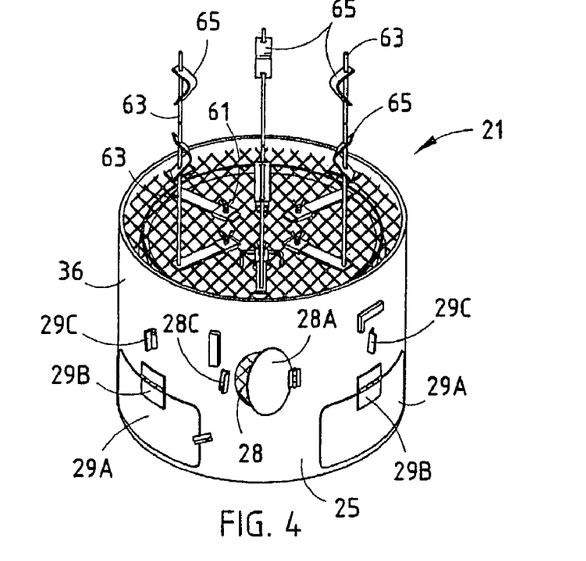
FIG. 4 is a fully assembled perspective view of the heating unit of FIG. 3.

The tubular bottom section 51 is short enough to not interfere with the open area under the grating 37/38, but long enough to direct grease past the grating 37. The top grease-catching section 50 is frustoconically shaped, such that grease dripping from food cooking on the upper grating 52 is caught by the catching section 50, funneled to the center tubular bottom section 51 and communicated down through the seasoning pan 32 to a tin cup 42' or other collection pan under the grating 37/38. The seasoning pan 32 is located between the funnel 30 and the burning charcoal on the gratings 37/38, such that the grease on the funnel 30 is partially protected from the direct heat and fire from the burning charcoal. This is particularly true when the seasoning pan 32 is filled with water or moist seasoning flavoring. The tubular bottom section 51 can be any shape or size, but it is contemplated that a diameter of about 1 inch to 1½ inches will work well. A U-shaped handle 54 is attached to a top of the grease-catching section 50 to assist in lifting the greasy funnel 30 out of the heating unit 21 for cleaning after use. The outer lip of the grease-catching section 50 leaves a gap to the sidewall of the seasoning pan 30 and also terminates short of the inside surface of the sidewall of the large diameter cooking chamber 22 so that there is a good air gap to allow flow of heat, seasoned vapors, and air upward along the sidewall. The outer lip of the grease-catching section 50 extends to about the diameter of the smaller diameter cooking chamber 23, so that the heated air passes upward outside of the sidewall of the smaller diameter cooking chamber 23.

The upper grating 52 (FIG. 2) includes strap holders 60 with threaded holes for receiving screws 61 extended into the holes. Adjustable food holders 62 include a vertical rod 63 and flat feet-like tabs 64 that slide into a space between the strap holders 60 and the grating 52. By sliding the tabs 64 farther and farther under the strap holders 60, and by angling the food holders 62 under the strap holders 60, the food holders 62 can be positioned in a number of different positions adapted to hold food. For example, the food holders 62 can be arranged in two parallel lines for holding a rack of ribs, or can be positioned in a circle for holding a whole chicken.

It is contemplated that other food holders can be used. For example, food holders 62A (FIG. 15) have rods 63 and flat feet-like tabs 64, but include a fastener or stud 61A that secures a diamond-shaped tab 126 under the tabs 64. The tabs 126 are shaped to fit through the openings 126A in the grating 52 and, when the food holder 62A is rotated, interlockingly engage the wire strands of the grating 52 to hold the holder 62A in an upright position. The studs 61A can be fixed or rotatable to the tab 64 depending upon the design of the food holder 62A.

Figure 10:
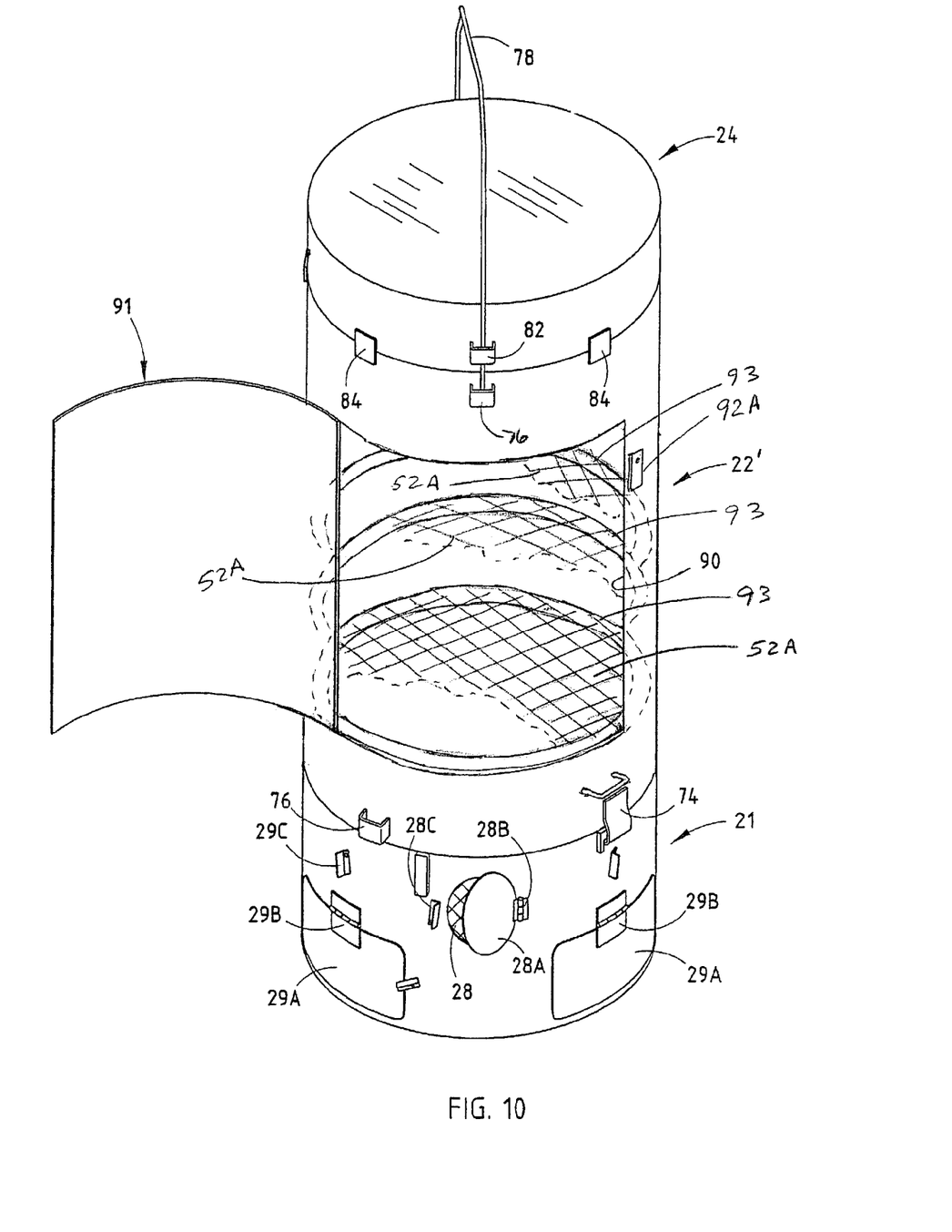

Vertically adjustable pan-holder brackets 65 (FIG. 2) can be attached to the vertical rods 63 at selected heights. The illustrated brackets 65 are C-shaped strips of spring steel and include a pair of holes shaped to receive the rods. By bending the brackets 65 to a release position, slipping them to a selected height on the rods 63, and then releasing the brackets 65 so that they extend and interlockingly grip the rods 63, the brackets 65 can be positioned at a common height in a circle for holding a pan or the like. It is specifically contemplated that different brackets and holders can be put onto the rods or onto the sides of the chambers 22–24. Other food and tray supporting devices can also be used. For example, note the ring-shaped brackets 93 attached to the sidewalls of the chamber 22', on which gratings 52A are rested (FIG. 10), as discussed below.

Figure 14:
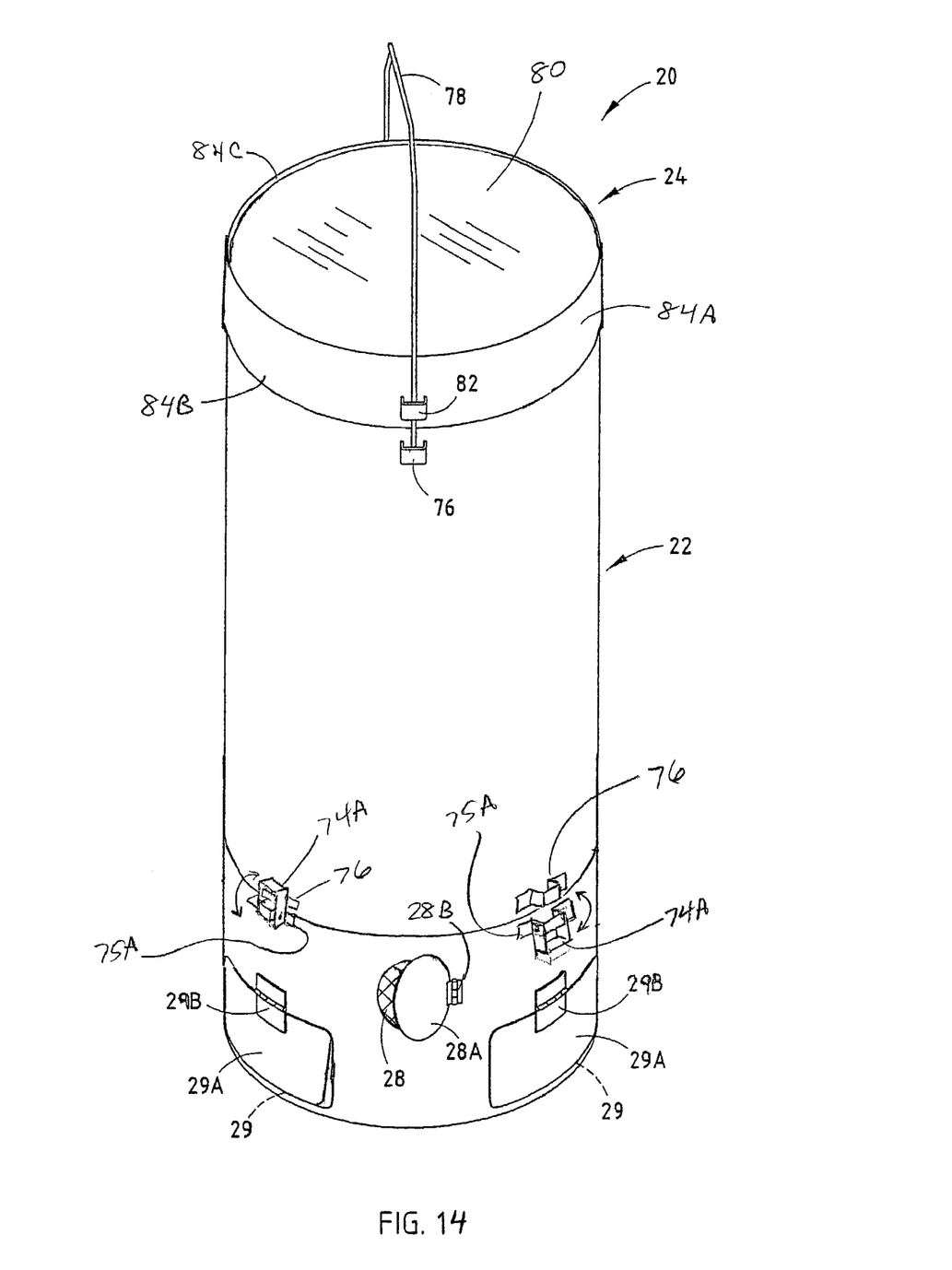

Cooking chamber 22 (FIG. 1) is a larger diameter than cooking chamber 23. Cooking chamber 22 includes a top panel 70 and a sidewall 71 that is slightly larger than a diameter of the housing 25. A U-shaped handle 72 can be attached at each side near the open end of the cooking chamber 22, if desired, to assist in carrying the chamber 22. Alignment flanges 73 extend from the end of sidewall 71 that is adjacent the top panel 70. The alignment flanges 73 are arranged to engage an outside surface of the housing sidewall 36 to hold the chamber 22 on the heating unit 21. A pair of interlock tabs 74 extend downwardly from opposite sides of the chamber 22, and include an end shaped to interlockingly releasably engage an L-shaped finger 75 on the sidewall 36 of the heating unit 21. When rotationally engaged, the finger 75 locks with the interlock tabs 74 so that the chamber 22 and heating unit 21 can be lifted and carried as a single unit, even when the charcoal is burning. Tabs 74 and fingers 75 can be replaced with a U-shaped latch 74A pivoted to a hat-shaped bracket 75A for engaging bracket 76 (FIG. 14). (In FIG. 14, the left latch 74A is closed/latched, right latch 74A is open.) Alternatively, coil springs or straps can be hooked between the brackets 75A and 76. Other ways are also contemplated.

Cooking chamber 22 (FIG. 2) further includes four strap brackets 76 positioned around the sidewall 71. The strap brackets 76 define a cavity, and include a pin 77 that extends through a center of the cavity. A bent-wire handle 78 includes a pair of short transversely bent ends 79. By manipulating the handle 78, the bent ends 79 can be extended through and under the brackets 76, through the respective cavities under the brackets 76 and around and past the pins 77. When the handle 78 is moved to a vertical position and lifted, the bent ends 79 cannot slip past the pins 77, but instead they engage and lift on the pins 77. By this arrangement, a removable handle 78 is securely attached to carry the chamber 22, but is easily removable for cleaning.

Figure 1:
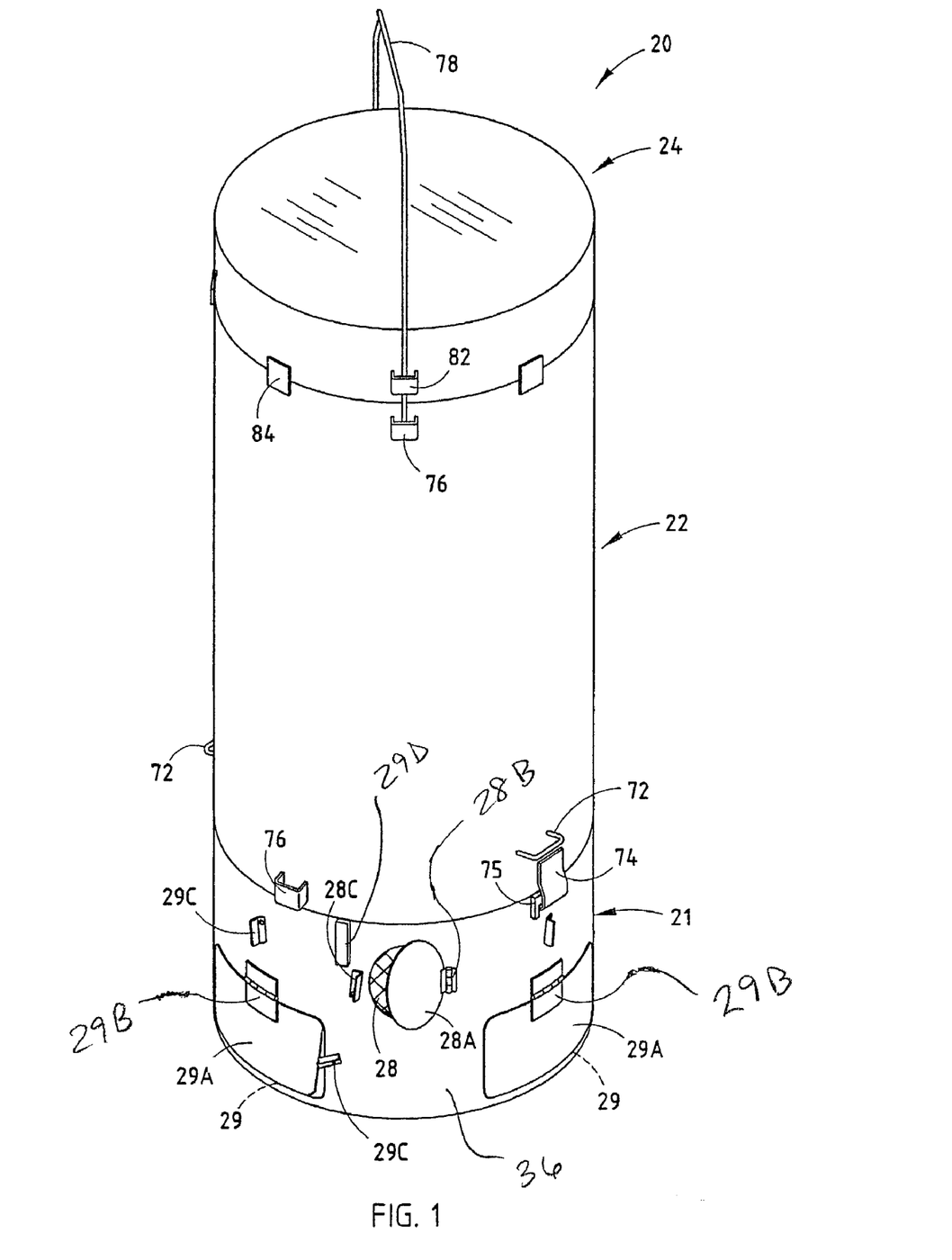
FIG. 1 is a perspective view of an outdoor cooking apparatus embodying the present invention.

The short-height cooking chamber 24 (FIG. 2) includes a flat panel 80 and a sidewall 81 forming a pan optimally shaped to form a warming pan for buns and pies. Attached to the sidewall 81 are loop brackets 82 similar in size and shape to brackets 76. As shown in FIGS. 1 and 2, the handle 78 can be extended to fit through both of the brackets 82 and 76, such that the warming cooking chamber 24 can be held on top of the large diameter cooking chamber 22 to simultaneously carry the combined cooking chambers 22 and 24 with the handle 78. The cooking chamber 24 also includes alignment flanges 84 similar to the alignment flanges 73 on the chamber 22. Notably, when the cooking chamber 22 is in the inverted position with its flat top panel at the top, the cooking chamber 22 can be positioned in an upwardly open condition or in a downwardly facing position, since it is held on top of the cooking chamber 22 with the alignment flanges 73. Notably, the flanges 84 can be replaced by a continuous ring 84A that lies adjacent wall 81 and that forms an overlapping bottom flange 84B for engaging the top of the chamber 22 (FIG. 14) and a top flange 84C that forms a top shallow recess with the top panel 80. This forms a good surface for cooking pancakes, for example. A grease channel can be formed around the perimeter of the panel 80, if desired, to make it better suited for cooking hamburgers.

Figures 11, 12:
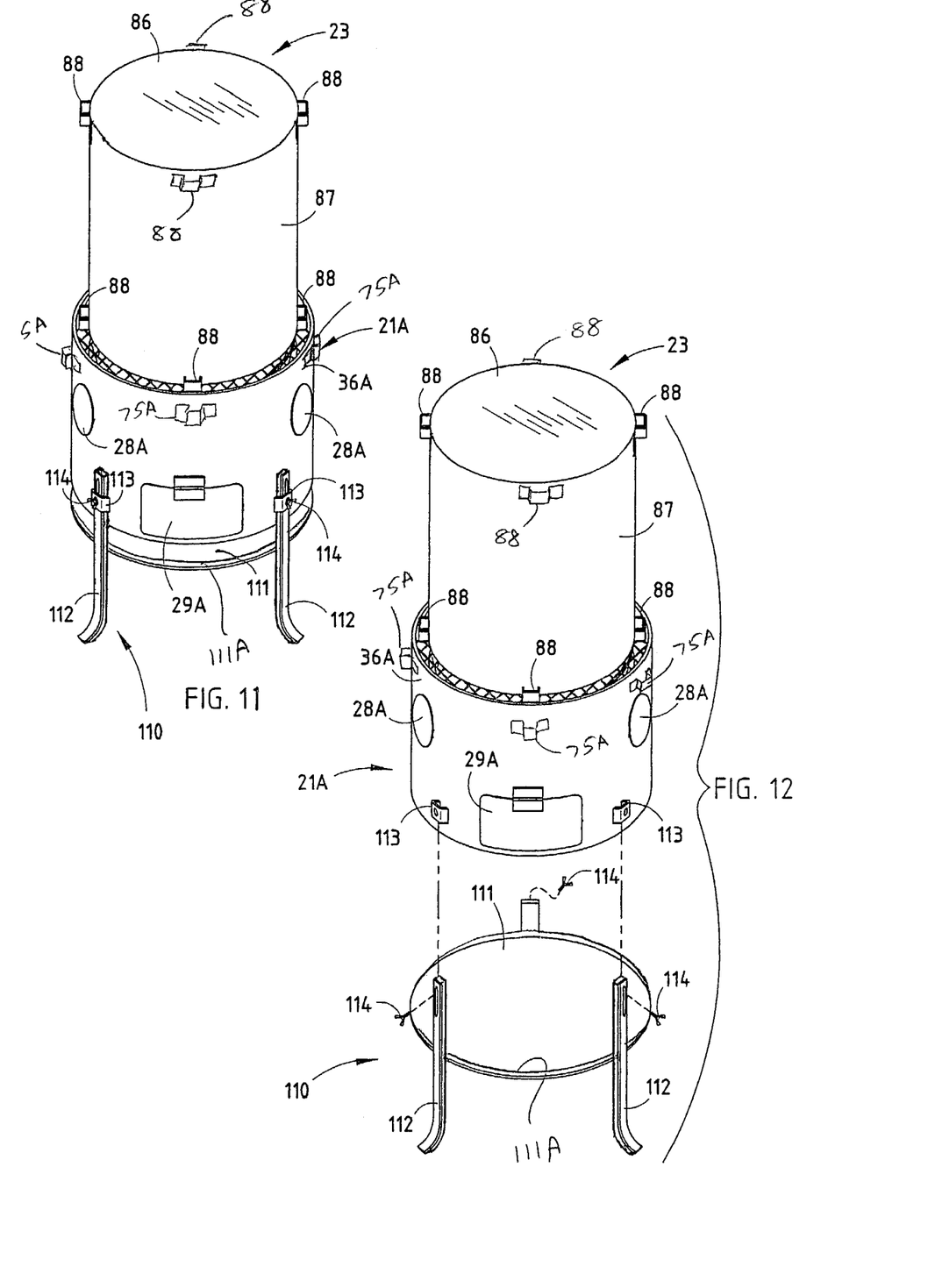
FIGS. 11 and 12 are perspective views of a modified heating unit, the heating unit including a bottom panel with legs, the legs adjustably supporting the heating unit in a manner allowing simultaneous control over air flow into the heating unit.

The smaller-diameter cooking chamber 23 (FIG. 2) has a flat end panel 86 and a sidewall 87 having a smaller diameter than the cooking chamber 22 by a dimension about equal to a radial length of the strap brackets 76 (i.e. about 1 to 2 inches). Strap brackets 88 (similar to brackets 76) are positioned around the sidewall 87 at both ends of the chamber 23. The shape and size of the brackets 88 causes the cooking chamber 23 to center itself within the housing 25 of the heating unit 21. Several alignment flanges 89 are attached to the sidewall 87 near the end panel 86, with the alignment flanges 89 extending both radially and longitudinally. Thus, when the larger diameter cooking chamber 22 is set on the smaller diameter cooking chamber 23, the bottom and sidewall of the chamber 22 engage the alignment flanges 89. This helps keep a well-defined air space around and above the inner chamber 23 (i.e. between the outer and inner chambers 22 and 23) with a uniform gap size. The alignment flanges 89 also act as mini-feet for holding the chamber 23 above a table surface, which can help keep a very hot container of food (i.e. the chamber 23) off a table top when serving food from the chamber 23. The flanges 89 can be replaced with different shapes, such as flanges 89A (FIG. 12).

Figure 5:
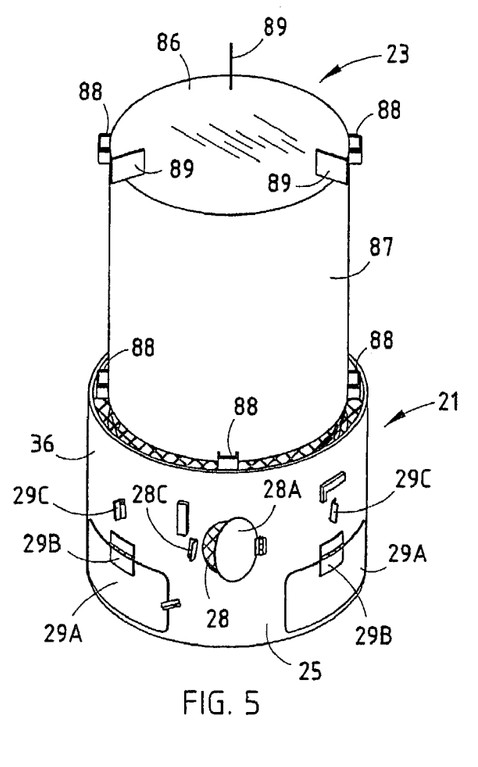
FIG. 5 is a perspective view of the heating unit with the smaller-diameter tall cooking chamber of FIG. 2 thereon, the cooking chamber having its open end facing downward for "oven" style cooking.
Figure 6:
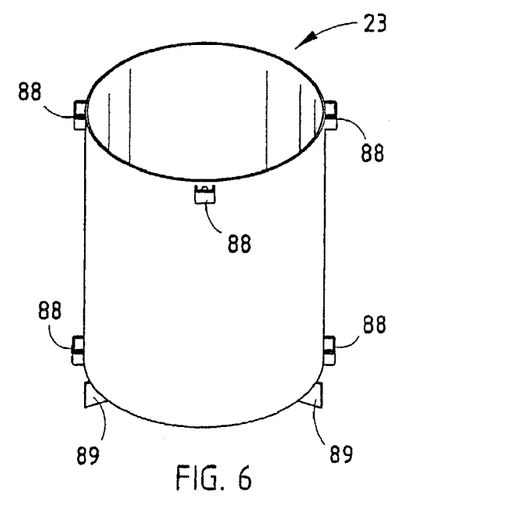
FIG. 6 is a perspective view of the smaller-diameter tall cooking chamber, inverted to show its open end facing upwardly for "soup" style cooking.
Figure 7:
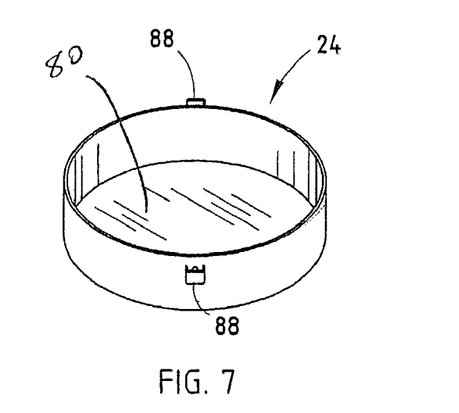
FIG. 7 is a perspective view of the low-height pan of FIG. 2, the pan being inverted for "frying" style cooking.

As is apparent by studying FIGS. 1, 2, and 5, the components of the cooking apparatus are rearrangeable to satisfy many different needs. For example, the small diameter cooking chamber 23 can be arranged on the heating unit 21 as illustrated by FIG. 5, with a chicken positioned on the rod-suspended food holders 62 above burning charcoal. The large diameter cooking chamber 22 can be positioned on the smaller cooking chamber 23 to create a uniform and controllable temperature. This also captures moisture, and helps keep the meat soft and tender. Seasoning can be added into the seasoning pan 32. Bread buns can be placed in the bun pan (cooking chamber 24), and frozen vegetables can be placed in a pan in the space under the grating 37/38. Thus, a whole meal can be cooked. When finished, the chambers 22–24 can be lifted as a unit by handle 78. Alternatively, the cooking chamber 23 can be positioned by itself on the heating unit 21, with its open end up, such that soup and the like can be heated. Alternatively, hamburgers and hot dogs can be cooked on the grill 52, with or without the seasoning pan 32 being filled with seasoning, and with or without the top being covered by one of the cooking chambers 22–24. Alternatively, pancakes can be cooked on the outside surface of flat panel 80 of the chamber 24.

Figure 8:
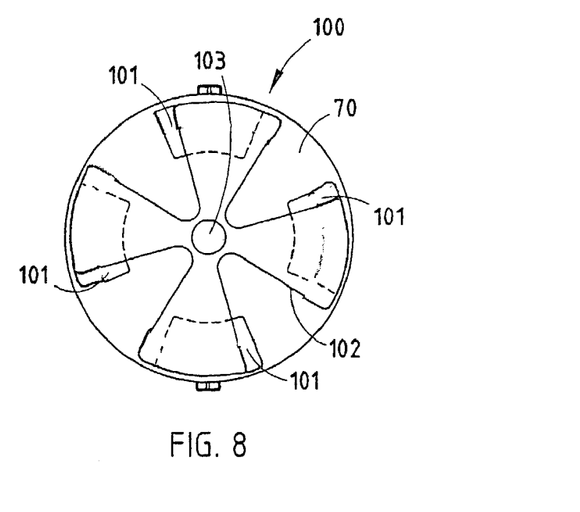
FIG. 8 is a top view of a modified version of the cooking chamber shown in FIG. 2, the modified version including a top panel with air-controlling flutes rotatable to vary an amount of air flow through apertures in the top panel.

In one modification, the top panel 70 of the large diameter chamber (FIG. 8) (or the flat panel 80 of the cooking chamber 24, or the flat end panel 86 of the cooking chamber 23), is modified to include an air control valve 100 in the form of apertures 101 cut into the panel, and a planar X-shaped valve 102 having hands on the ends of arms for selectively covering (or uncovering) the apertures 101. The valve 102 is one-piece, and includes a center body pivoted by a rivet 103 in its center. The arms extend radially from the center body to locations where they will gradually uncover the apertures 101 as the valve 102 is rotated. The apertures 101 extend close to an outer edge of the panel 70 so that the heat will pass up and around the edges of any pan or chamber set on the panel 70.

Figure 9:
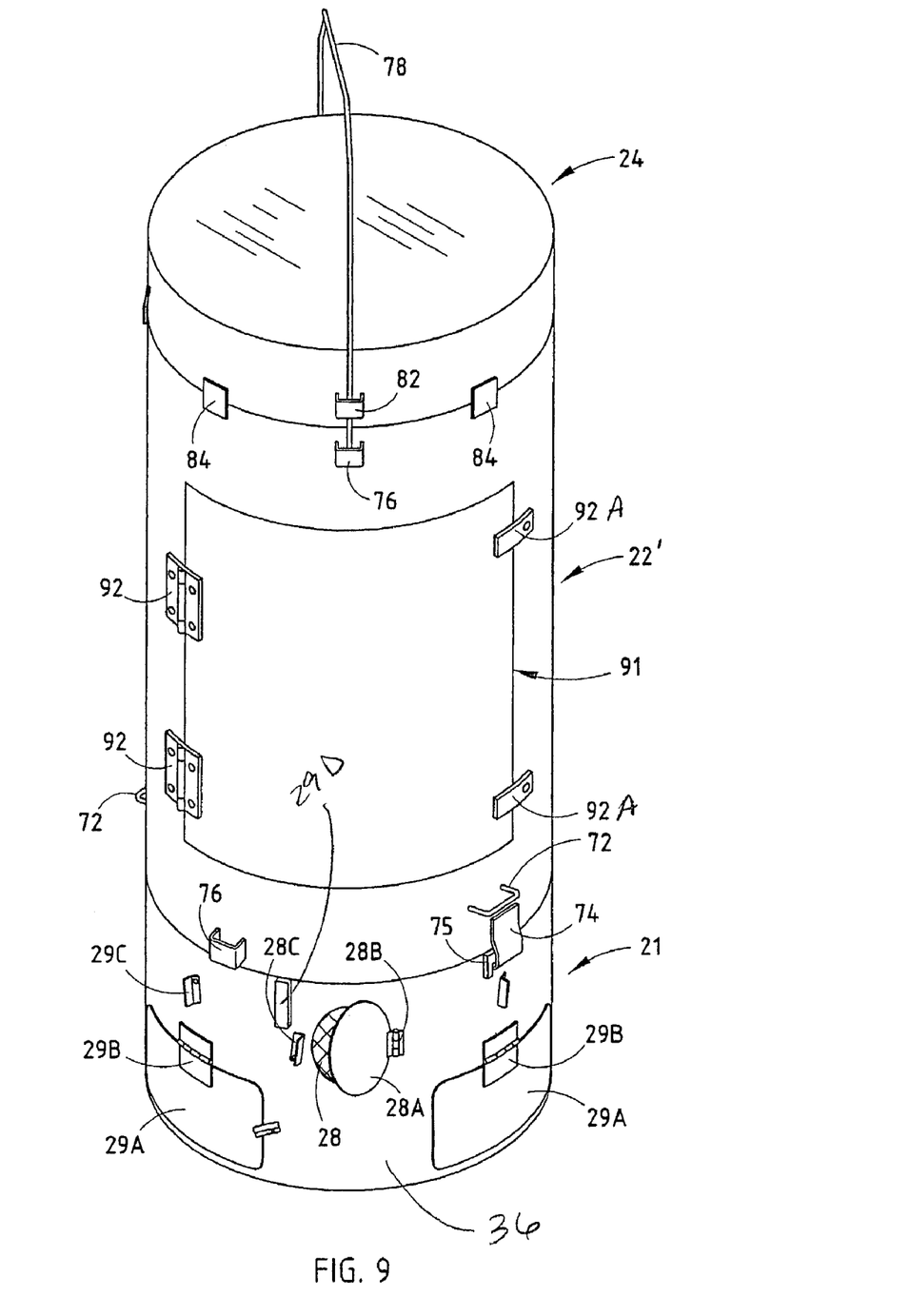
FIGS. 9 and 10 are perspective views of another modified version of the cooking chamber shown in FIG. 2, the cooking chamber including a large side door and internal shelf brackets for supporting food within the oven-like recess in the cooking chamber.

In another modification, the large diameter chamber 22' (FIGS. 9–10) includes a large opening 90 formed in one side of the sidewall 71. A door 91 is shaped to close the opening 90, and includes at least one hinge 92 (two are shown) on one side and at least one latch 92 (two are shown) on an opposite side. Inside the cooking chamber 22, a pair of wall-attached supports 93 are attached. The ring supports 93 may extend completely around an inside of the chamber (see bottom support 93, FIG. 10), or may be discontinuous across the opening area (see the upper two supports 93). The illustrated supports 93 have an L-shaped cross section, with their top flange defining a flat plane capable of receiving and supporting grates 52A similar to grates 52. The top flange of supports 93 can extend inboard a desired amount, depending on the design of the particular cooking apparatus 20. The illustrated top flanges extend inboard about 1 to 1½ inches.

Figure 13:
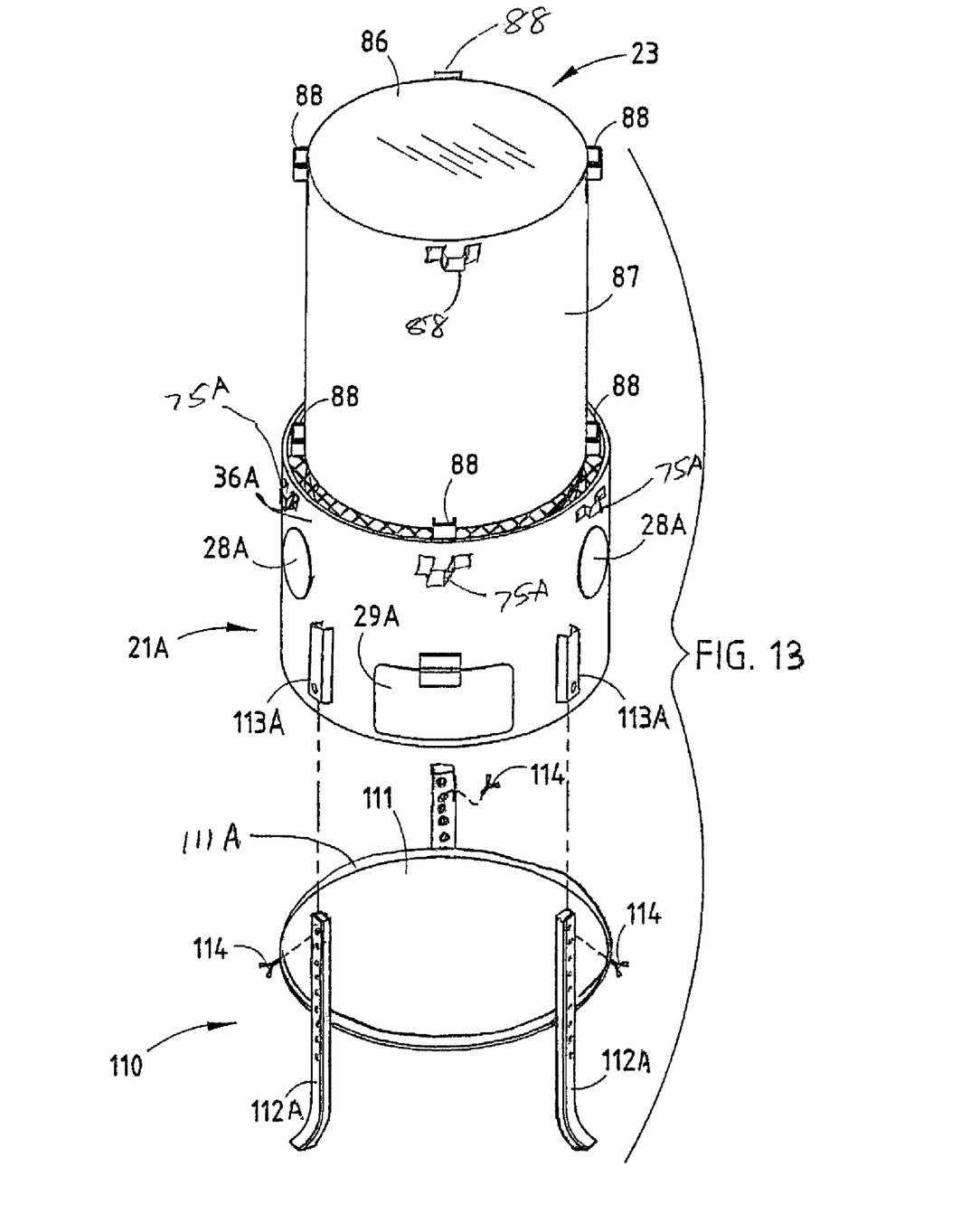
FIGS. 13–15 are views of modified cooking apparatus similar to FIGS. 12, 1, and 2, respectively.

In yet another modification, the heating unit 21A (FIGS. 11–12) is modified to include adjustable legs. Specifically, the heating unit 21A does not include a bottom panel, but instead includes a leg assembly 110. The leg assembly 110 includes a horizontal plate 111 with an edge lip 111A that is about ¼ inch to ½ inch high, and further includes three (or more) legs 112 attached to edges of the plate 111. The legs 112 have a rectangular or square cross section. Loop brackets 113 on sides of the bottom of the housing 25A of the heating unit 21A include threaded holes for receiving wingheaded screws 114. The legs 112 can be adjustably extended upwardly into the loop brackets 113, and are secured in place when the screws 114 are tightened. By adjusting a distance of the plate 111 from a bottom edge of the heating unit sidewalls 36A, the amount of air entering the charcoal burning area can be closely controlled. Potentially, the lower openings 29 and associated doors 29A can be eliminated, although it is not preferable to do so. It is contemplated that different leg arrangements are possible. For example, note legs 112A (FIG. 13) which have multiple holes for setting particular heights. The illustrated leg 112 have a partial-depth slot that engages an end of the screws 114 to limit extension of the legs 112 until the screws 114 are fully removed. Also, it is contemplated that the legs (112) could be welded to the sidewall of the housing 25A, and the plate (111) could be made adjustable and/or removably attached to the legs.

It is noted that the number of openings 28/29, doors 28A/29A, brackets and holders 60/65/76/82, legs 113, flanges 73, and the like, positioned around the sidewalls of the various components can be varied in number from the illustrated arrangement. For example, three legs may be preferred for stability to prevent tip-over. Alternatively, where the ground surface will be relatively flat or soft enough to dig into, five or six legs may be preferred.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. An outdoor cooking apparatus comprising:
   a base heating unit including a housing and including a support in the housing adapted to support burning charcoal, the housing having at least one air outlet and at least one air inlet above and below the support, respectively; and
   at least one cooking chamber with a bottom shaped to removably interlockingly engage the housing for secure positioning on the heating unit when cooking food, whereby the heating unit and cooking chamber can be carried separately or as a unit, wherein the heating unit includes at least one closeable door covering at least one of the air inlets and air outlets.

2. The apparatus defined in claim 1, wherein the housing defines an oven chamber below the support and also an access opening to the oven chamber so that food can be cooked below the support as well as above the support.

3. The apparatus defined in claim 1, wherein the at least one cooking chamber includes a first cooking chamber shaped to fit within a second cooking chamber, with the first and second cooking chambers defining an air gap therebetween.

4. The apparatus defined in claim 1, wherein the at least one cooking chamber includes a first cooking chamber with a top section and a second cooking chamber with a bottom shaped and constructed to mateably telescopingly engage and nest into the top section in a stacked arrangement.

5. The apparatus defined in claim 1, wherein the at least one cooking chamber includes ring-shaped food holders fixed within the cooking chamber.

6. The apparatus defined in claim 1, wherein the heating unit includes telescopingly extendable adjustable legs.

7. The apparatus defined in claim 1, wherein the at least one cooking chamber includes a first chamber having a diameter matching a shape of the housing of the heating unit, a second chamber shaped to fit within the first chamber for insulated oven-simulating cooking, and a low-height third chamber for warming, the first, second, and third chambers being adapted for stacked nested interconnection.

8. The apparatus defined in claim 1, wherein at least one chamber includes an inner and outer chamber combination forming a cylindrically-shaped uniform gap beginning near a top of the heating unit and extending to a top of the at least one chamber.

9. The apparatus defined in claim 1, including a removable handle shaped and configured to engage mating features on the at least one cooking chamber for lifting the at least one cooking chamber and heating unit as a single assembly.

10. The apparatus defined in claim 1, wherein the heating unit includes at least one door on each of the air inlets and air outlets.

11. The apparatus defined in claim 1, wherein the heating unit and the at least one cooking chamber have releasable interlocking lock members that interlockingly engage by rotation of the cooking chamber relative to the heating unit.

12. An outdoor cooking apparatus comprising:
    a base heating unit including a housing and including a support in the housing adapted to support burning charcoal, the housing having at least one air outlet and at least one air inlet above and below the support, respectively; and
    at least one cooking chamber with a bottom shaped to removably interlockingly engage the housing for secure positioning on the heating unit when cooking food, whereby the heating unit and cooking chamber can be carried separately or as a unit, wherein the at least one cooking chamber includes first and second opposing ends, each constructed to fit telescopingly and mateably into a top of the heating unit, whereby the at least one cooking chamber can be selectively inverted and used as a soup heating unit or as a bottom-open oven-simulating unit.

13. An outdoor cooking apparatus comprising:
    a base heating unit including a housing and including a support in the housing adapted to support burning charcoal, the housing having at least one air outlet and at least one air inlet above and below the support, respectively; and
    at least one cooking chamber with a bottom shaped to removably interlockingly engage the housing for secure positioning on the heating unit when cooking food, whereby the heating unit and cooking chamber can be carried separately or as a unit, and
    an upper grating with vertically and horizontally adjustable holders.

14. The apparatus defined in claim 13, wherein the at least one cooking chamber includes an adjustable air vent.

15. An outdoor cooking apparatus comprising:
    a base heating unit including a housing and including a support in the housing adapted to support burning charcoal, the housing having at least one air outlet and at least one air inlet above and below the support, respectively; and
    at least one cooking chamber with a bottom shaped to removably interlockingly engage the housing for secure positioning on the heating unit when cooking food, whereby the heating unit and cooking chamber can be carried separately or as a unit, wherein the heating unit includes a grease funnel having an angled grease-catching section and a down tube section for funneling grease from the grease-catching section down past the support and burning charcoal to a location under the support.

16. The apparatus defined in claim 15, wherein the heating unit includes a pan constructed to sit under the funnel and between the funnel and the support so that burning hot charcoal on the support does not emit heat directly onto the funnel, causing the grease to potentially catch fire.

17. An outdoor cooking apparatus comprising:
    a base heating unit including a housing and including a support in the housing adapted to support burning charcoal, the housing having at least one air outlet and at least one air inlet above and below the support, respectively; and
    at least one cooking chamber with a bottom shaped to removably interlockingly engage the housing for secure positioning on the heating unit when cooking food, whereby the heating unit and cooking chamber can be carried separately or as a unit, wherein the heating unit includes a pan constructed to set above the support, the pan defining a recess for holding seasoning and smoke-generating material, such that burning hot charcoal on the support causes smoke to be generated and emitted up into the at least one cooking chamber for flavoring foods being cooked.

18. An outdoor cooking apparatus comprising:
    a base heating unit including a housing, a grill adapted to support food being cooked in the housing, and a support below the grill for supporting burning charcoal, the housing having at least one air inlet below the support;
    a funnel-shaped grease catcher adapted to catch grease dripping from the food on the grill, the grease catcher having a funnel member adapted to direct the grease to a location below the support and below the burning charcoal for collection; and
    a pan shaped to hold seasoning, the pan being shaped to receive the funnel member while at least partially protecting the funnel member from direct heat from the burning charcoal so that the grease does not burn and start a fire, the pan including a bottom and a sidewall defining a recess to hold the seasoning, but the sidewall having an upper lip defining a gap to the funnel member so that flavorful vapors rising from the pan flow up and around funnel member to flavor the food being cooked.

* * * * *